United States Patent
Cheatle

(10) Patent No.: US 7,035,477 B2
(45) Date of Patent: Apr. 25, 2006

(54) IMAGE COMPOSITION EVALUATION

(75) Inventor: Stephen Philip Cheatle, Bristol (GB)

(73) Assignee: Hewlett-Packard Development Comapny, L.P., Houston, TX (US)

( * ) Notice: Subject to any disclaimer, the term of this patent is extended or adjusted under 35 U.S.C. 154(b) by 727 days.

(21) Appl. No.: 10/169,835

(22) PCT Filed: Dec. 20, 2001

(86) PCT No.: PCT/GB01/05675

§ 371 (c)(1),
(2), (4) Date: Jul. 10, 2002

(87) PCT Pub. No.: WO02/052839

PCT Pub. Date: Jul. 4, 2002

(65) Prior Publication Data

US 2002/0191860 A1    Dec. 19, 2002

(30) Foreign Application Priority Data

Dec. 22, 2000 (GB) .................................... 0031423
Jun. 30, 2001 (GB) .................................... 0116082

(51) Int. Cl.
*G06K 9/20* (2006.01)
(52) U.S. Cl. ..................................... 382/282
(58) Field of Classification Search ................. 382/282
See application file for complete search history.

(56) References Cited

U.S. PATENT DOCUMENTS

| 3,956,758 | A | * | 5/1976 | Numata et al. ............. 396/290 |
| 4,317,620 | A | | 3/1982 | Coppa et al. |
| 4,384,336 | A | | 5/1983 | Frankle et al. |
| 4,423,936 | A | | 1/1984 | Johnson |
| 4,541,704 | A | | 9/1985 | Freeman |
| 4,605,970 | A | | 8/1986 | Hawkins |
| 4,724,330 | A | | 2/1988 | Tuhro |
| 5,091,654 | A | | 2/1992 | Coy et al. |
| 5,227,889 | A | | 7/1993 | Yoneyama et al. |
| 5,345,284 | A | | 9/1994 | Tsuruta |

(Continued)

FOREIGN PATENT DOCUMENTS

EP      0 456 414 A2      11/1991

(Continued)

OTHER PUBLICATIONS

Teruo, "Foreground Picture Extracting Method, Picture Processor, Automatic Trimming Device, Recording Medium and Portrait Picture Device," *Patent Abstracts of Japan*, vol. 2000, No. 05, Sep. 14, 2000, JP 2000-036032, Feb. 2, 2000, Abstract.

(Continued)

*Primary Examiner*—Jingge Wu
*Assistant Examiner*—Jordan Kuhn
(74) *Attorney, Agent, or Firm*—Foley & Lardner LLP

(57) ABSTRACT

A method of providing composition evaluation of an image includes analyzing a composed image in accordance with one or more predefined composition rules and providing a report or warning signal if one or more of those compositional rules have been contravened. The analysis includes identifying regions of compositional significance within the image and applying the compositional rules to those regions. The compositional rules may include well known photographic composition rules such as the "rule of thirds", ensuring that there are no large expanses of foreground or background with little or no regions of significance within them, and ensuring that the edge of the composed image does not bisect any regions of significance.

31 Claims, 11 Drawing Sheets

U.S. PATENT DOCUMENTS

| | | | |
|---|---|---|---|
| 5,384,615 A * | 1/1995 | Hsieh et al. | 396/84 |
| 5,486,893 A * | 1/1996 | Takagi | 396/147 |
| 5,500,711 A * | 3/1996 | Sasagaki et al. | 396/287 |
| 5,511,148 A | 4/1996 | Wellner | |
| 5,517,242 A | 5/1996 | Yamada et al. | |
| 5,666,186 A * | 9/1997 | Meyerhoefer et al. | 396/281 |
| 5,900,909 A * | 5/1999 | Parulski et al. | 348/231.6 |
| 5,978,519 A * | 11/1999 | Bollman et al. | 382/282 |
| 6,067,112 A | 5/2000 | Wellner et al. | |
| 6,671,405 B1 * | 12/2003 | Savakis et al. | 382/203 |
| 2002/0028071 A1 | 3/2002 | Molgaard | |
| 2002/0114535 A1 | 8/2002 | Luo | |
| 2002/0191861 A1 * | 12/2002 | Cheatle | 382/282 |
| 2004/0080670 A1 * | 4/2004 | Cheatle | 348/441 |

FOREIGN PATENT DOCUMENTS

| | | |
|---|---|---|
| EP | 0 595 299 | 5/1994 |
| EP | 0 824 246 | 2/1998 |
| EP | 0 912 047 | 4/1999 |
| EP | 0 924 923 | 6/1999 |
| EP | 0 949 802 | 10/1999 |
| EP | 1 158 464 A1 | 11/2001 |
| GB | 2 124 055 | 2/1984 |
| GB | 2 350 251 | 11/2000 |
| JP | 6-059430 | 3/1994 |
| JP | 2000244800 A * | 9/2000 |
| JP | 2001148843 A * | 5/2001 |
| WO | WO 95/32581 | 11/1995 |
| WO | WO 99/03264 | 1/1999 |
| WO | WO 99/09887 | 3/1999 |
| WO | WO 00/38417 | 6/2000 |
| WO | WO 03/012678 A2 | 2/2003 |

OTHER PUBLICATIONS

K. Hachimura et al., "Image Retrieval Based on Compositional Features and Interactive Query Specification", *IEEE*, Sep. 3, 2000, pp. 262-266.

C. Ordonez et al., "Discovering Association Rules Based on Image Content", *IEEE*, May 19, 1999, pp. 38-49.

* cited by examiner

IMAGE COMPOSITION EVALUATION

FIELD OF THE INVENTION

The present invention relates to method of providing image composition evaluation, or advice, and to an image composition evaluation system utilising the method.

BACKGROUND OF THE INVENTION

The capturing of an image, whether that image is being captured permanently on photographic film or as a digital still image, or whether the image is being captured as a moving image using a video camera or television camera or the like, nearly always first involves composing the image prior to capture. This is normally accomplished through a view finder or other similar arrangement associated with the camera apparatus. Successfully composing an image to produce a pleasing picture is a skill normally acquired over time and is a skill that inexperienced camera users often find difficult to acquire. Even experienced photographers or camera users can sometimes overlook some compositional aspects of an image due to a lack of concentration at the time of capture of the image, or due to capturing the image in a hurry.

A pleasingly composed image often follows one or more known composition rules. These rules include, for example, positioning elements of interest according to the "rule of thirds", ensuring that elements of interest are not positioned too close to the edge of the image frame, framing the main area of interest by placing areas of very little interest at the edge of the image, for example placing relatively dark areas, or areas containing relatively little activity, at the edge of the image, and positioning strong diagonal lines to run towards the main subject of the image. The "rule of thirds" involves subdividing the image area using two equally spaced horizontal lines and two equally spaced vertical lines (in the manner of a "noughts and crosses" board) and positioning elements of interest on the intersections of the horizontal and vertical lines, or equally placing strong horizontal or vertical features on one of the horizontal and vertical lines.

Although these rules of composition are well known and can be studied, inexperienced photographers often find them difficult to apply. In particular, the lack of immediate feedback concerning the proposed composition of an image makes the learning process time consuming and difficult.

It has been proposed by the present applicant in the co-pending United Kingdom patent application number GB 0031423.7 to provide a method and system for automatically cropping an image after it has been captured to improve the composition of the image. The automatic cropping method disclosed in this co-pending application is based on automatic selection of one or more of the composition rules indicated above. While this post capture analysis and cropping is very useful, a disadvantage of this method is that by cropping an image after it has been captured the resulting cropped image is either smaller than the original image or is of a lower resolution than if the subject had been correctly framed in the first place. This is because inevitably by cropping the image its size is reduced and it is therefore necessary, in order to return the cropped image to the same size as the original image, to increase the size of each picture element that comprises the image. Also, cropping an image after it has been captured does not allow the full inclusion of any objects, or areas of interest, that were only partially included in the originally, poorly composed, image. Similarly, if there is inadequate border between the areas of interest and the edge of the original image, this cannot be corrected by subsequent post capture cropping.

BRIEF SUMMARY OF THE INVENTION

It would therefore be advantageous to provide an indication of how well a proposed image conforms to these well known composition rules prior to capture of that image. This can be considered as providing automatic composition advice.

According to a first aspect of the present invention there is provided a method of providing composition evaluation, the method comprising acquiring an image, analysing the composition of said image in accordance with a predefined set of composition rules, and providing a report concerning the composition of the image.

Preferably the analysis is performed by an image processor. It is preferred that the image is acquired by an image detector array.

Preferably, the analysis comprises identifying one or more regions of compositional significance within said detected image and applying said set of composition rules to said one or more identified regions. It is preferred that the composition rules are heuristic.

In a preferred embodiment of the present invention, the step of analysing the composition of the image comprises the steps of:

i. Processing the image to identify at least one feature relevant to the composition of the image;

ii. Selecting at least one compositional rule from a plurality of compositional rules based on the relevance of the compositional rules to one or more of the identified features; and iii. To determine whether the image is appropriately composed.

Regions of compositional significance include both regions that should be included and regions which should be excluded. Excluded regions may for example include figures who only partially appear in the image.

The composition analysis may be performed in response to a composition evaluation request signal.

The report may be either a visual warning signal or an audio signal. Where the report is, a visual warning signal it may be displayed on an image viewing means. The image viewing means may be a display, such as an LCD display. Additionally or alternatively, the report may be is a visual warning signal displayed on an image viewing means and wherein the visual warning signal indicates one of the identified regions of interest that contravene at least one of the composition rules. The report may highlight the compositional error by giving a message such as "the horizon is too close to the centre" or a "person is too close to the edge" in textural and/or audible form.

According to a further aspect of the present invention there is provided an image composition evaluation apparatus comprising an image receiving element arranged to convert an image into an electrical signal, and an image processor arranged to receive said electrical image signal, analyse the composition of said image in accordance with a predefined set of composition rules and provide a report concerning the composition of the image.

Preferably, the image processor is arranged to perform the analysis in response to receiving a composition evaluation signal. The composition evaluation signal may be generated in response to the actuation of a composition evaluation request switch. Preferably, the composition evaluation switch may comprise or be included in an image capture switch arranged to activate an image capture system to capture the analysed image.

The report may be in the form of a warning signal.

Preferably, the warning signal comprises a visual warning signal. The visual warning signal may be displayed on a display device which may optionally function as an image view finder.

Alternatively or additionally, the warning signal may comprise an audio signal.

Preferably, the image composition evaluation system may be included in a motion picture camera or in a still picture camera.

Alternatively, the report may highlight those areas which should or could form the subject of the image. Thus areas of interest may be highlighted whereas areas which are boring or dull may be greyed out. This gives a rapid indication of how the user should recompose the image by for example panning, zooming or repositioning the subject(s) to improve the image.

Thus, the report may also suggest crop boundaries for the recomposed image.

BRIEF DESCRIPTION OF THE DRAWINGS

The present invention will now be described, by way of example, with reference to the accompany drawings in which.

DETAILED DESCRIPTION

Figure 1:
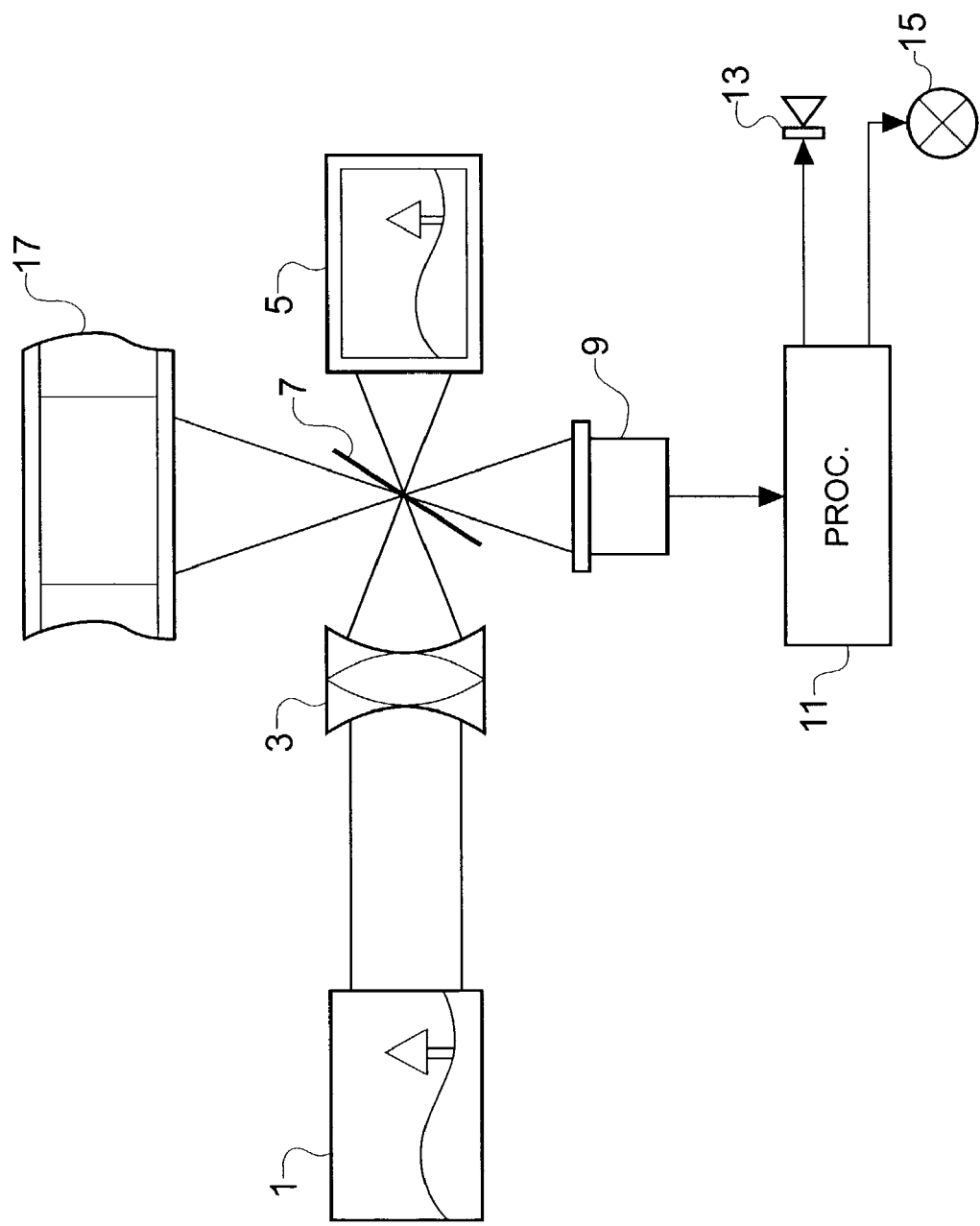
FIG. 1 schematically illustrates an image composition evaluation system according to an embodiment of the present invention incorporated within a film camera.

FIG. 1 schematically illustrates an image composition evaluation system constituting an embodiment of the present invention, in conjunction with a film camera system. A subject 1 is optically focussed by a lens system 3 which receives light from the subject and focuses it onto a view finder 5. In this particular example the view finder 5 is part of both the image composition evaluation system and the optical camera system. Using a hinged mirror 7, of the type well known from single lens reflex cameras, the image 1 is also focused on a image converter 9. The image converter 9 may, for example, be a photo-detector array. The image converter 9 converts the optical image signals into an electrical image signal. Connected to the image converter 9 is an image processor 11 that performs image composition evaluation on the received image. Should the image processor 11 determine that the received image contravenes one or more of a predefined set of composition rules, a warning signal is generated. The warning signal may be an audio warning signal produced using an audio loudspeaker 13, or alternatively the warning signal may be a visual warning signal produced, for example, by illuminating a warning lamp 15 or by giving a textural message. The visual warning may be visible through the image view finder 5. Equally, both an audio warning signal and visual warning signal may be generated. The image 1 may also be captured on photographic film 17 by the focussing elements 3 and the mirror 7. The capture of the image 1 on the photographic film 17 may take place after the image composition evaluation system has evaluated the composition of the image, thus providing the user of the camera system with the opportunity of recomposing the image 1 to finally capture a more pleasingly composed image.

Figure 2:
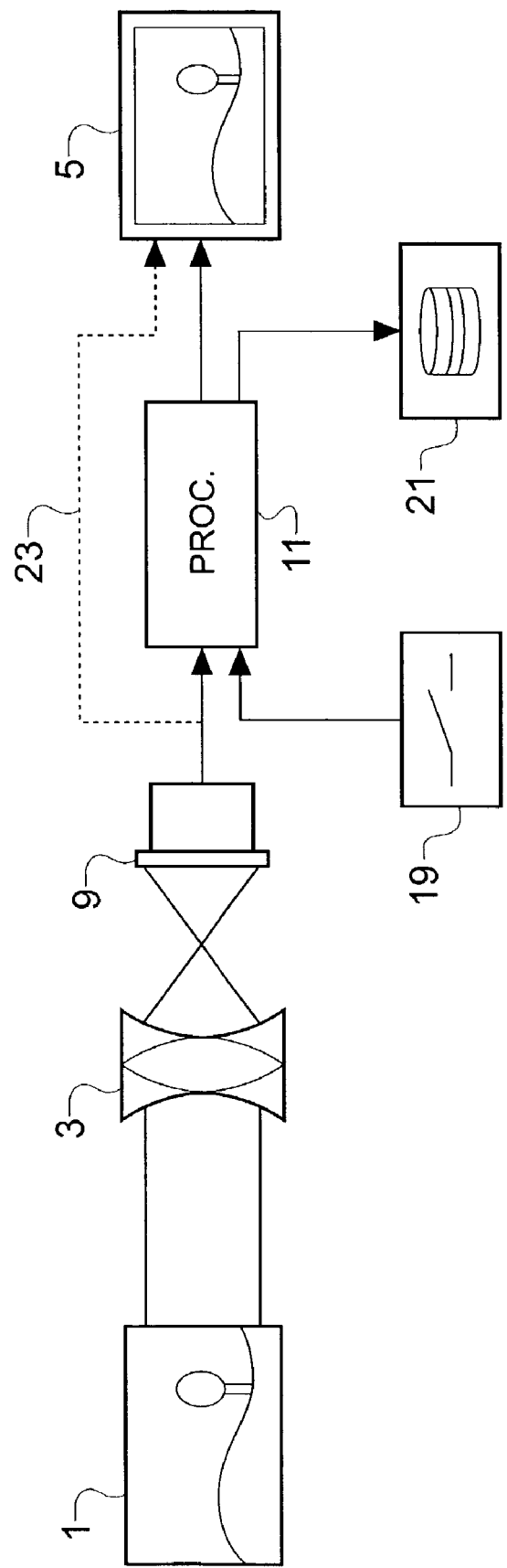
FIG. 2 schematically illustrates an image composition evaluation system according to a further embodiment of the present invention incorporated within an electronic image capture system.

FIG. 2 shows an alternative arrangement of an image composition evaluation system constituting an embodiment of the present invention, in conjunction with an electronic image capture system. Unless otherwise stated, those parts that are common between the system shown in FIG. 2 and the system shown in FIG. 1 are numbered with identical reference numerals. An image 1 is optically focused using lens system 3 that receives the image 1 and focuses it onto an image conversion device 9 to convert the optical image into an electronic image signal. The image signal is then passed to an image processor 11 where image composition evaluation is performed. The image processor may also output the image signal to an image view finder 5 which may be implemented as a display, such as a LCD display. Alternatively, the electronic image signal from the image convertor 9 may be fed directly to the image view finder 5, as indicated by hash line 23 of FIG. 2. Having evaluated the composition of the image, the image processor may provide a visual warning system in the image view finder 5 in addition to displaying the image. The visual warning system may simply be the illumination, or flashing, of a symbol, message, warning lamp or LED within the image view finder 5, or may be represented by highlighting, dimming, or otherwise indicating, those areas of the image that specifically contravene one or more of the predefined set of composition rules. The image composition evaluation may occur continuously, as just described, or may only occur in response to an image composition evaluation request signal provided from an composition evaluation request switch 19. The composition evaluation switch 19 may also serve as an image capture switch as part of an electronic image capture system that causes the image processor to capture the image 1 onto an electronic recording media 21. The image composition evaluation switch 19 may in this case be a two, or three position switch where the first position generates the image composition evaluation request signal but the switch 19 must be manipulated into a further, for example the second, position to cause image capture to occur.

In one embodiment of the present invention, the method of performing the image composition evaluation comprises identifying one or more regions of compositional significance or interest within the image and applying one or more predefined compositional rules to the identified regions. Suitable compositional rules may, for example, include the "rules of thirds", rejecting any regions of compositional significance that are too close to the edge of the image, ensuring that a "main region of interest" is always in the image, and more likely in the centre of the image, ensuring that relatively large areas containing very few regions of interest or significance are, if possible, not included in the image.

Figure 3:
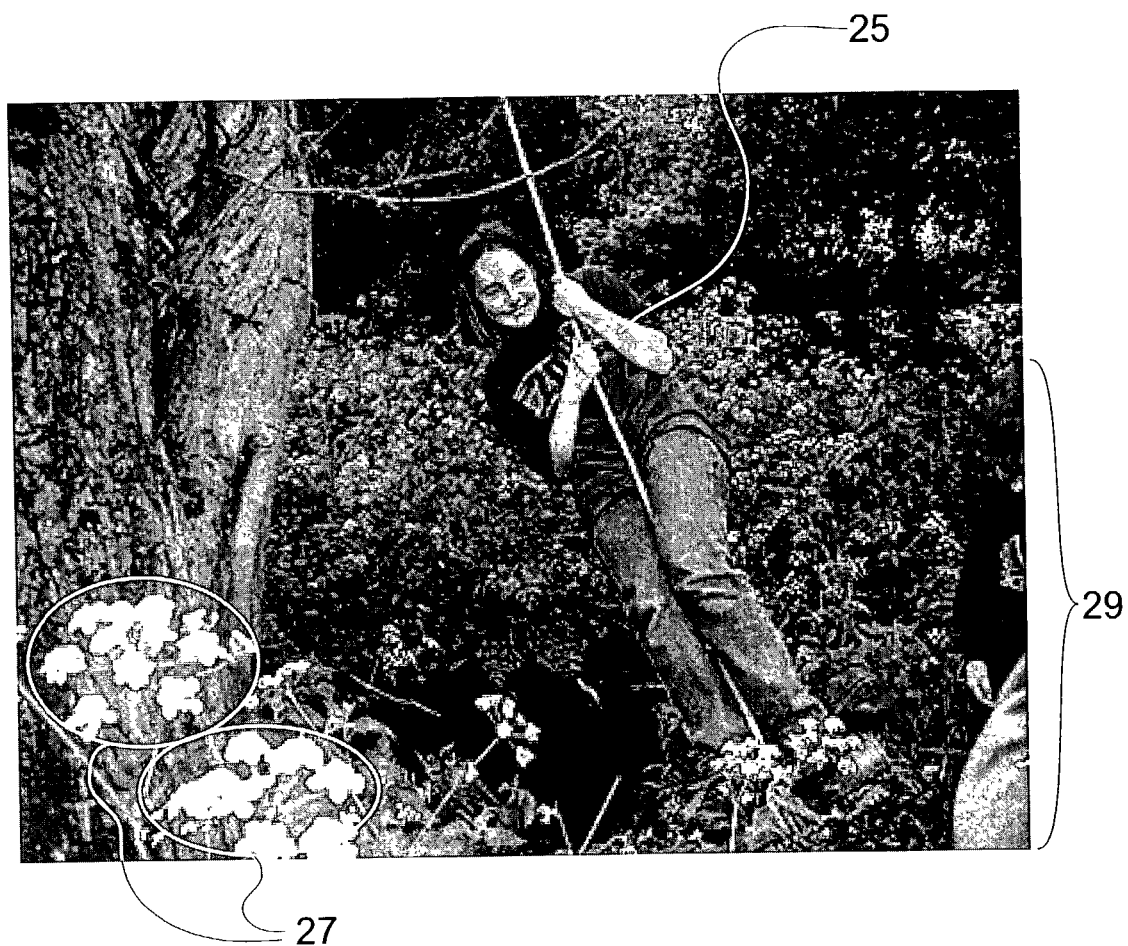
FIG. 3 shows an image on which composition evaluation may be performed according to an embodiment of the present invention.
Figure 4:
FIG. 4 shows an improved composition of the image of FIG. 3.
Figure 5:
FIG. 5 shows an alternative improved composition of the image of FIG. 3.

FIG. 3 shows an image composed in a casual manner, perhaps by an inexperienced photographer. The girl on the swing 25 represents the main subject of the image. However, other potential regions of interest include the flowers 27 located at the bottom left hand corner of the image. Also, a serious compositional error has been made by only including part of a figure 29 shown at the right hand side of the image. The system of the present invention may, for example, issue a message indication that figure 29 should be fully included or fully excluded from the image. FIG. 4 illustrates one possible recomposition of the image that satisfies most compositional rules. In FIG. 4 the main region of interest, the girl 25, is now the sole region of interest within the image, the final image having been recomposed to exclude the flowers 27 and the partial figure 29 of the original image shown in FIG. 3. FIG. 5 shows an alternative recomposition of the image of FIG. 3 where only the partial figure 29 has been excluded. Of course other possible recompositions exist, such as recomposing the image to include the totality of the figure 29 shown in FIG. 3 or recomposing to only include the flowers 27 as the sole region of interest. The final composition of the image remains the choice of the operator of the composition evaluation system. Where multiple recompositions exist, the user may instruct the image processor to present them for review. This may occur by activation of a further switch, or other input means such as existing keys or voice commands.

Various schemes are known for selecting a region of interest from an electronic image. One such scheme is described in the present applicants co-pending UK patent application number GB 0031423.7 entitled "automatic cropping of electronic images". A summary of the scheme disclosed in GB 0031423.7 will now be described for the sake of completeness with reference to the image shown in FIG. 3. It will be appreciated that although only shown using a grey scale image to a reproduction, the original image of FIG. 3 was in colour.

An automated image processing system has no a-priori knowledge of the subject matter of the photograph and therefore needs to process it in order to extract some form of representation which will indicate where the compositionally significant regions of the photograph lie.

Figure 6:
FIG. 6 shows the image of FIG. 3 after re-sampling to reduce the number of active pixels.

The photograph 10 may have been taken with a camera having in excess of 2,000,000 active pixels. Analysing such a large number of pixels would be computationally very significant indeed. Thus prior to performing any other processing stamps, the image processor down samples the image in order to reduce the number of pixels therein. FIG. 6 schematically illustrates the same image as shown in FIG. 3, but after down sampling to 240 by 180 pixels. This down sampling has reduced the number of active pixels to 43,200. Following the down sampling, the down sampled image is then converted into an image having compressed colour variation whilst still retaining intensity variations. An example of such a processing is converting the image to the YCC colour space format. It should be noted that this is not the only colour space representation which could be used. Thus, the CIELAB colour space system can also be used. This system is well known, and defines a space in which the lightness L*, which is a measure of how bright a colour is, is plotted against the vertical axis, and two further measurements a* and b* are defined as linear axes with a* defining the colour from a red to green scale and the b* axis indicating colour on a blue to yellow scale. The measurements a* and b* are in the horizontal colour plane and are perpendicular to each other such that this colour system defines an orthogonal cartesian space. Each of the L*, a* and b* axis are defined in such a way that one unit on any of the scales has approximately the same "visibility" making this system both linear and isotropic as regards human perception. The L* axis has a scale from zero (black) to 100 (white) whilst the a* and b* scales range from −60 to +60 each. This system has the advantage that a colour difference of one unit has substantially the same visibility at any part of the colour space.

Following conversion of the image to a colour space, areas within the converted image having similar colour and intensity are generated and grown. This process commences by blurring the image, and then the blurred image is analysed in order to form "seed areas" that have a smooth colour and intensity. The seed areas are then grown by adding areas adjacent to the boundary of the seed areas where those adjacent areas have a sufficiently similar colour and intensity. A test is made to determine whether all of the pixels within the colour compressed image have been allocated to seed areas. If not the blur and region grow process is repeated in an iterative manner.

Figure 7:
FIG. 7 shows the image of FIG. 6 once the image has been blurred and subdivided into regions of similar appearance.

FIG. 7 schematically illustrates the image of FIG. 6 once all of the image has been blurred and assigned to regions. At this stage the image shown in FIG. 7 contains approximately 2,800 regions, some 2,200 of which contain 10 or less pixels.

Figure 8:
FIG. 8 shows the image of FIG. 7 following further region merging.

The image processing then continues by merging adjacent areas of the image which are separated by "weak edges". "Weak edges" are those boundaries that separate areas of the picture which have a relatively low colour or intensity differences. In other words, the regions which are close to one another within the YCC or CIELAB space. Adjacent areas with similar mean colours are then merged together, and then the image is analysed to determine if small areas, that is areas whose size is less than a threshold value, are completely enclosed by another larger area. If so, then the small area is merged into the larger area. A test may be made to determine whether the number of individual regions has fallen to below a predetermined threshold number. If it is judged that there are still too many regions, the merge can be repeated, possibly with the definition of what constitutes a weak edge being changed such that the distance in the colour space by which colours must be separated before they are regarded as sufficiently different not to be merged may be increased. FIG. 8 shows the image following the region merging.

The image is further analysed in order to cluster similar colours together until such time as the number of colours has dropped to an appropriate number, which is typically in the region of 20 or so. The image of clustered colours is schematically illustrated in FIG. 9.

It should be noted that as used herein a region is a spatially connected sub-area of the image. However a cluster is a collection of similar regions, but the regions do not need to be adjacent to one another.

Figure 9:
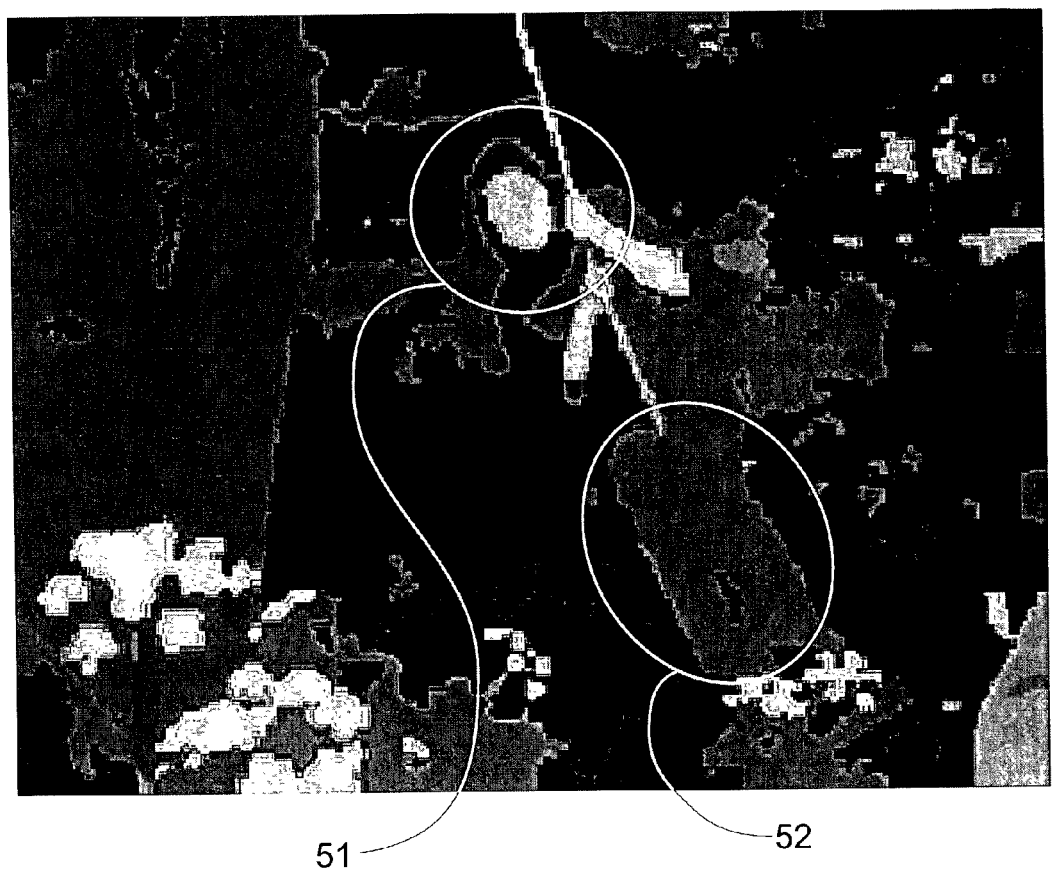
FIG. 9 shows the image of FIG. 8 following colour clustering.

It can be seem with reference to FIG. 9 that the main part of the flowers 27 have been merged into areas of uniform colour. Similarly, the girl's face has been merged into an area of uniform colour 51 as have her trousers 52. Large areas of the background have also been merged into areas of substantially uniform colour, for example the tree towards the left hand side of the image.

Next an interest metric is formed on the basis of the unusualness of the colour, and the image is analysed to determine the compositionally significant properties therein from amongst a plurality of different possible properties.

One such analysis that may be performed is the analysis of the clustered colours shown in FIG. 9 to determine how unusual they are. The image shown in FIG. 9, as noted hereinbefore, comprises approximately 20 or so different colour clusters. These clusters are then sorted in order to identify how many pixels belong to each one of the colours.

Each of the colour clusters is processed in turn. When a colour is processed, the colour distance between it and each of the other colour clusters is calculated, the clusters are then sorted in order of colour distance from the colour cluster being processed. A cumulative histogram can then be formed for the colour cluster under test, by counting the cumulative sum of image pixels which are included in an increasing number of clusters along the colour distance dimension.

Clusters which, together with closely coloured neighbouring clusters, occupy a relatively large proportion of the pixels of the image are deemed to be background. Conversely, cluster colours which together with closely coloured neighbouring clusters occupy only a relatively small proportion of the pixels of the image are deemed to be foreground. By this analysis, cluster colours can be allocated a default saliency based on the likelihood that they are foreground colours.

However, colour mapping is not the only process that is applied in order to determine a saliency image. In general, those regions which are located towards the edges of the image may be penalised as they may belong to objects which are not fully in frame.

Further processes, such as pattern recognition may also be applied to the image. Thus, a search may be made to identify bodies or faces as a result of comparing areas within the image against models held within a model library.

Figure 10:
FIG. 10 shows a saliency image for the image of FIG. 3.

FIG. 10 schematically illustrates a saliency image of FIG. 3 following the conclusion of the one or more analysis processes.

The saliency image is processed to subdivide it into a small number of large areas (typically rectangles) which enclose the majority of the saliency in the image. Thus, the selected areas enclose the bright regions of the saliency image. One method of doing this is to form the sums of saliency pixel values along each row, and separately, down each column. Plotting these sums against the vertical and horizontal axes respectively, shows the vertical and horizontal distributions of saliency. These can then be analysed to find the widest minimum in either the vertical or horizontal saliency distribution. The image can then be split into three parts at this minimum. A first part comprises a horizontal, or as the case may be vertical, band through the image having a width substantially corresponding to that of the minimum. This part can be ignored as non salient. This will then leave two parts of the image each side of this minimum band which will contain saliency (except in the case where the minimum band is adjacent one of the edges of the image in which case there will only be one non-empty or salient side). These parts can each be processed by the same algorithm. The part with the widest minimum can be split in an analogous manner, discarding the width of the minimum and hence splitting that part into two smaller parts. This process can continue with each stage splitting the part about the best minimum until one of the following limiting conditions is reached:

a. No minimum can be found in any of the remaining parts. I.e. no minimum is found which is sufficiently wide and sufficiently low in saliency.
b. The fraction of the total saliency of the image which is outside of the retained block reaches some predetermined limit, such as 5%.

The result of this process is that a small set of rectangular blocks which enclose the major areas of saliency of the image are derived.

Suppose that the image is initially framed such that, as shown in FIG. 3, it includes unwanted features.

Once features relevant to the composition of the image have been identified, the saliency map can now include regions of the image which are defined as include regions and exclude regions. Thus, considering FIG. 11A the girl has been identified as an "include" region and has been framed by a crop boundary 60 which represents the minimum boundary possible to include all of the girl therein. Similarly, the flowers have been identified as an include region and have been framed by a crop boundary 61 representing the minimum crop required to include the flowers. Furthermore, "must exclude" regions have been identified and enclosed by crop boundaries 64 and 66 respectively. However, these regions may be highlighted to a user such that he is given the opportunity to recompose the image in such a way that these features are fully included.

Figure 11B:
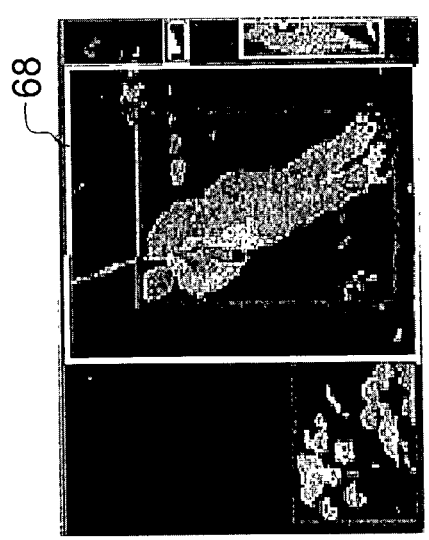
FIGS. 11a, 11b and 11c illustrate potential minimum and maximum cropping boundaries.
Figure 11C:
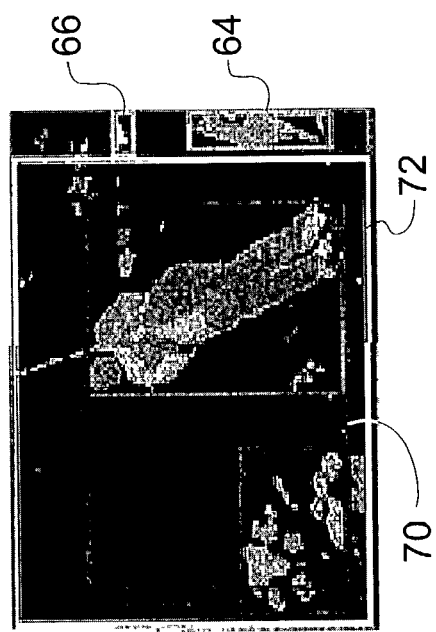
Figure 11A:
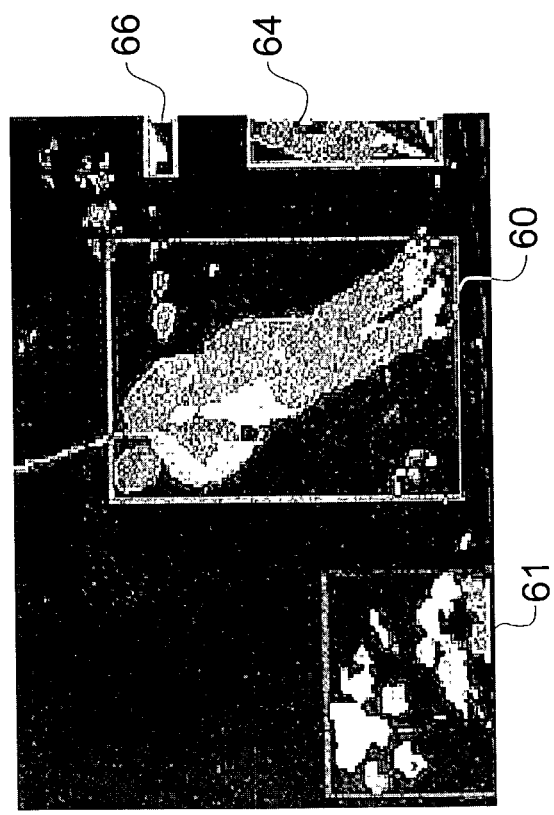

Thus, at this point, and optionally in response to preferences set by the user, the user may be presented with an image corresponding to or based on that shown in FIG. 10 where compositionally significant regions are highlighted; or an image similar to that of FIG. 11*a* where minimum crop boundaries are represented. Indeed such images could be colour coded such that the include regions are presented in one colour, for example green, whereas the exclude regions are presented in another colour, such as red.

The exclude regions may be significant and for example, it may be desired to re-frame the image such that the partial figure 29 is fully framed within the image. This compositional option can be given to a user of the present invention. However, it is self evident that the figure 29 could not be included in a system which utilised only post capture image processing.

Other problems might also be indicated at this point, such as the inclusion of large boring areas, badly placed horizons, the image being tilted, people looking out of frame, the camera pointing directly into the sun, edges with unnecessarily high levels of activity, and so on. This gives the user the opportunity to recompose the photograph.

As a further alternative, the user may be presented with suggested recompositions of the image. In order to do this, some further processing is required. An example of these additional processes is given below.

Having identified the minimum crop boundary, it is then advantageous to identify the maximum crop boundary. With regards to FIG. 11B, one potential maximum crop boundary 68 has been identified. This crop boundary abuts the must exclude regions 64 and 66, but also abuts the edge of the include region 61. The boundary also extends between the upper and lower edges of the photograph. This crop boundary 68 represents the maximum crop boundary available to include the girl but to exclude the flowers. However, an alternative crop boundary is available which includes both the girl and the flowers. Thus, as shown in FIG. 11C a further minimum crop boundary 70 can be defined which includes both the girl and the flowers (with partial exclusion of the flowers being allowed because they are so close to the edge), and a further maximum crop boundary 72 has also been defined which extends to the upper and lower edges of the photograph, to the left hand edge, but abuts the must exclude regions 64 and 66 at the right hand edge thereof.

The saliency map is analysed in order to determine how many areas of interest exist therein. Thus, if the saliency map shows N distinct areas of interest (for example areas of interest separated by some area of non-interest as determined by some adaptively set threshold) possible minimum cropping rectangles can be generated which contain alternative combinations of between 1 and N areas of interest where the minimum cropping rectangle contains a selected combination of areas of interest and excludes other areas. Thus this corresponds to generation of minimum cropping rectangle 60, 61 and 70 in FIGS. 11A and 11C. It should be noted that not all combinations may be possible as they may not be contained within a single rectangle that excludes one or more of the non-selected areas. The maximum cropping rectangle for the each single or combination of areas of interest is the maximum rectangle which contains the areas of interest but excludes the non-selected areas of interest. Thus this corresponds to rectangles 68 and 72 in FIGS. 11B and 11C.

Each minimum cropping rectangle 60, 61 and 70 and its associated maximum cropping limit (of which only cropping limits 68 and 72 are shown in FIGS. 11B and 11C) is then processed in turn. However, some initial sorting may reduce the processing required. One of the compositional rules may require that a large well centred interesting area in the image is deemed to be essential. If we apply this rule then only minimum cropping boundaries 60 and 70 are permitted, with the flowers as defined by crop boundary 61 being excluded. The first step is to select a first one of the minimum cropping boundaries 60 and 70 as a potential cropping candidate, together with its cropping limits. As search is then made to identify possible edge locations for each of the edges.

Supposing that minimum and maximum crop rectangles have been defined, and that it is now desired to find the position of suitable crop boundaries between the minimum and maximum limits. For the purpose of this description, we are going to locate the edge of one boundary, occurring to the left hand side of the minimum crop rectangle. Given that the digital image can be considered as consisting of a plurality of columns, the left hand edge of the maximum crop rectangle is located in column P, whereas the left hand edge of the minimum crop rectangle is located in column Q. Columns P and Q are not adjacent.

Sequentially each of the columns between P and Q is examined in turn in order to generate a metric of how good that column would be as a border of the cropping rectangle. Thus, the metric is constructed such that dark areas or slowly changing pixels along the column incur a low cost penalty, whereas brighter areas or alternatively rapidly changing colours in a row of pixels achieve a high penalty rating. Furthermore, the rating may also be modified with regards to the proximity of that column to the minimum and maximum crop boundaries, or indeed the proximity of that column to the edge of the picture.

In a preferred embodiment of the present invention, the edge quality metric is a function of:
i. Brightness. That is dark edges are preferred and hence incur only a low penalty.
ii. Activity. That is the sum of the colour differences between regions crossed by a row or column is analysed, with low sums scoring a lower penalty.
iii. Saliency. That is the sum of the saliency values for pixels in the row or column is formed, with low saliency incurring a lower penalty.
iv. Distance from strong colour transitions parallel to, and on the inside of, the column or row being tested. The distance should not be too close nor too far and a weighted distance term is used to accomplish this. This latter criteria is used to avoid cropping too close to a feature, even if it is not part of the minimum cropping rectangle.

Figure 12:
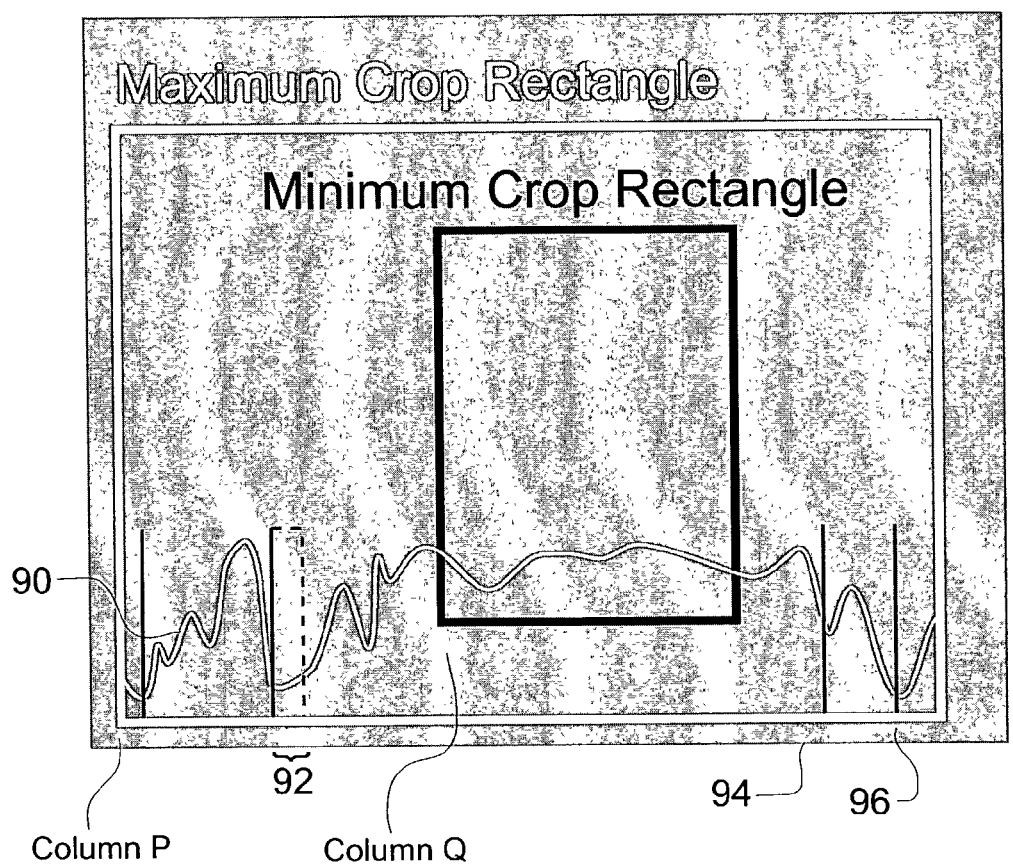
FIG. 12 illustrates a way of determining suitable positions for crop boundaries.

These factors are independently smoothed and normalised before being combined in order to form a weighted sum to generate the edge quality metric as shown in FIG. 12.

Thus for each one of the individual columns, a penalty measurement is formed, and the penalty measurement can then be plotted with respect to column thereby obtaining a penalty measurement profile 90. The profile 90 can then be examined to determine the position of minima therein, such as broad minima 92 or the sharper minima 94 and 96 which are then deemed to be potential cropping boundaries. This process can be repeated for each of the left, right, bottom and top crop boundaries individually, and may be repeated on a iterative basis such that for example those pixels in the column which lie above the upper crop limit or below the lower crop limit are excluded from the next iteration of the crop boundary. These candidate crops can then be subject to further constraints. In practice, there will be too many constraints to satisfy all of the constraints simultaneously. Constraints may include implementing the "rule of thirds" in respect of the horizon line. Similarly. the "rule of thirds" can be introduced to act on the main feature of interest to place it ⅓ of a distance from the edge of the crop.

The final crop is also be constrained by the aspect ratio of the camera.

Once a crop candidate has been identified, it is then evaluated by applying one or more rules. Each rule is implemented as a heuristically evaluated measure on the image.

Heuristic measures are used for compositional rules such as eliminating distractions close to the edge of the frame, minimum edge quality, a preference for dark or low activity boundaries, and so on.

The combination of different rule penalties by a weighted sum allows some rules to be considered as more important than others. Again, the weightings are determined heuristically.

Other known methods of identifying regions of interest from electronic image may equally be applied to embodiments of the present invention.

Thus, as noted hereinbefore, the different compositional rules used may have different weightings associated with them to vary the importance of those rules for example, particular attention may be paid to identify large boring areas, distractions at the edges of the image, or horizon lines that are centrally placed or placed very close to the top or bottom of the image frames. The weightings may vary depending on image content.

A criterion that may be attributed particular significance may be that of identifying regions of interest that extend beyond the edge of the frame. The user of the image evaluation system may be advised by means of the audio or visual warning signals to attempt to fully capture these features, or if the region of interest identified by the image composition evaluation system is actually a combination of multiple objects, to reposition the image capture system such that these two objects are not aligned. By following this advice it is more likely to produce an image composition where the true subject is well isolated from competing regions of interest, for example by being separated by background regions.

Where candidate crops are presented to a user, and the crops lie wholly within the original badly composed image, the user can be instructed to zoom and pan in order to match the fully framed image to the suggested crop. In order to achieve this an image of the suggested crop may be faintly displayed on the viewfinder in addition to the "current" image seen by the camera.

The invention claimed is:

1. A method of providing composition evaluation of an image, the method comprising:
acquiring an image;
analysing the composition of said image in accordance with a predefined set of compositional rules; and
providing a report concerning the composition of the image,
wherein said analysis comprises identifying one or more regions of compositional significance within said image and applying said set of compositional rules to said one or more identified regions, and
wherein said report is displayed on a display device and wherein said report indicates one of said identified regions of compositional significance that contravene at least one of said compositional rules.

2. A method of providing composition evaluation according to claim 1, wherein said analysis is performed in response to a composition evaluation request signal.

3. A method of providing composition evaluation according to claim 1, wherein said report is presented visually.

4. A method of providing a composition evaluation according to claim 3, wherein said report is a visual warning signal displayed on an image viewer.

5. A method as claimed in claim 1, wherein a plurality of possible recompositions of the image are displayed to a user.

6. A method of providing composition evaluation according to claim 1, wherein said report is an audio signal.

7. A method of providing composition evaluation according to claim 1, wherein said composition rules are heuristic rules.

8. A method of providing composition evaluation of an image as claimed in claim 1, wherein the step of analysing the image comprises:
a) processing the image to identify at least one feature relevant to the composition of the image;
b) selecting at least one compositional rule based on the relevance of the compositional rule to one or more of the identified features; and
c) determining whether the image is appropriately composed.

9. A method of providing composition evaluation of an image as claimed in claim 8 where the report concerning the composition of the image is presented visually.

10. A method of providing composition evaluation of an image as claimed in claim 9 wherein the report concerning the composition of the image is presented as textural comments.

11. A method of providing composition evaluation of an image as claimed in claim 8, wherein the relevant features are identified on the basis of unusualness of one of the colour and brightness in the image.

12. A method of providing composition evaluation of an image, the method comprising:
i. Acquiring an image;
ii. Processing the image to identify at least one feature relevant to the composition of image;
iii. Selecting at least two compositional rules from a plurality of compositional rules based on the relevance of the at least two compositional rules to one or more of the identified features;
iv. Determining whether the image is appropriately composed; and
v. Providing an output concerning the composition of the image,
wherein the Determining comprises identifying one or more regions of compositional significance within the image and applying the at least two compositional rules to the one or more identified regions, and
wherein the Providing comprises displaying the output on a display device and wherein the output indicates one of said identified regions of compositional significance that contravene at least one of the at least two compositional rules.

13. A method as claimed in claim 12, wherein at least one suggested crop of the image is calculated and presented on an output device.

14. A method as claimed in claim 12, wherein at least one suggested crop of the image is displayed to a user.

15. An image composition evaluation apparatus comprising:
an image receiving element arranged to convert an image into an electrical signal; and
an image processor arranged to receive said electrical image signal, analyse the composition of said image in accordance with a predefined set of composition rules and provide a report concerning the composition of the image,
wherein said image processor analyses the composition of said image by identifying one or more regions of compositional significance within said image and applying said set of compositional rules to said one or more identified regions, and
wherein said report is displayed on a display device and wherein said report indicates one of said identified regions of compositional significance that contravene at least one of said compositional rules.

16. An image composition evaluation apparatus according to claim 15, wherein said image processor is arranged to perform said analysis in response to receiving a composition evaluation request signal.

17. An image composition evaluation apparatus according to claim 16, wherein said composition evaluation request signal is generated in response to the actuation of a composition evaluation request switch.

18. An image composition evaluation apparatus according to claim 17, wherein said composition evaluation request switch comprises an image capture switch arranged to activate an image capture system to capture said analysed image.

19. An image composition evaluation apparatus according to claim 15, wherein said report is presented visually.

20. An image composition evaluation apparatus according to claim 19, wherein said report is a visual warning signal displayed on a view finder.

21. An image composition evaluation apparatus according to claim 15, wherein said report comprises an audio signal.

22. An apparatus as claimed in claim 15, in which the image processor causes suggested recompositions of the image to be presented to the user.

23. A motion picture camera including an image composition evaluation apparatus according to claim 15.

24. A still picture camera including an image composition evaluation apparatus according to claim 15.

25. An apparatus as claimed in claim 15, wherein the step of analysing the image comprises:
a) processing the image to identify at least one feature relevant to the composition of the image;
b) selecting at least one compositional rule based on the relevance of the compositional rule to one or more of the identified features; and
c) determining whether the image is appropriately composed.

26. An apparatus as claimed in claim 25 where report concerning the composition of the image is presented visually.

27. An apparatus as claimed in claim 26, wherein the report concerning the composition of the image is presented as textural comments.

28. An apparatus for providing composition evaluation of an image as claimed in claim 25, wherein the relevant features are identified on the basis of unusualness of one of the colour and brightness in the image.

29. An apparatus for providing composition evaluation of an image, comprising a photo detector for acquiring an image; and a processor for:
i. processing the image to identify at least one feature relevant to the composition of image;
ii. selecting at least one composition rule from a plurality of compositional rules based on the relevance of the compositional rule to one or more of the identified features;
iii. determining whether the image is appropriately composed; and
iv. providing an output concerning the composition of the image,
wherein the determining comprises identifying one or more regions of compositional significance within the image and applying the plurality of compositional rules to the one or more identified regions, and
wherein the providing comprises displaying the output on a display device and wherein the output indicates one of said identified regions of compositional significance that contravene at least one of the plurality of compositional rules.

30. An apparatus as claimed in claim 29, wherein at least one suggested crop of the image is calculated and presented on an output device.

31. An apparatus as claimed in claim 29, wherein at least one suggested crop of the image is displayed to a user.

* * * * *